UNITED STATES PATENT OFFICE.

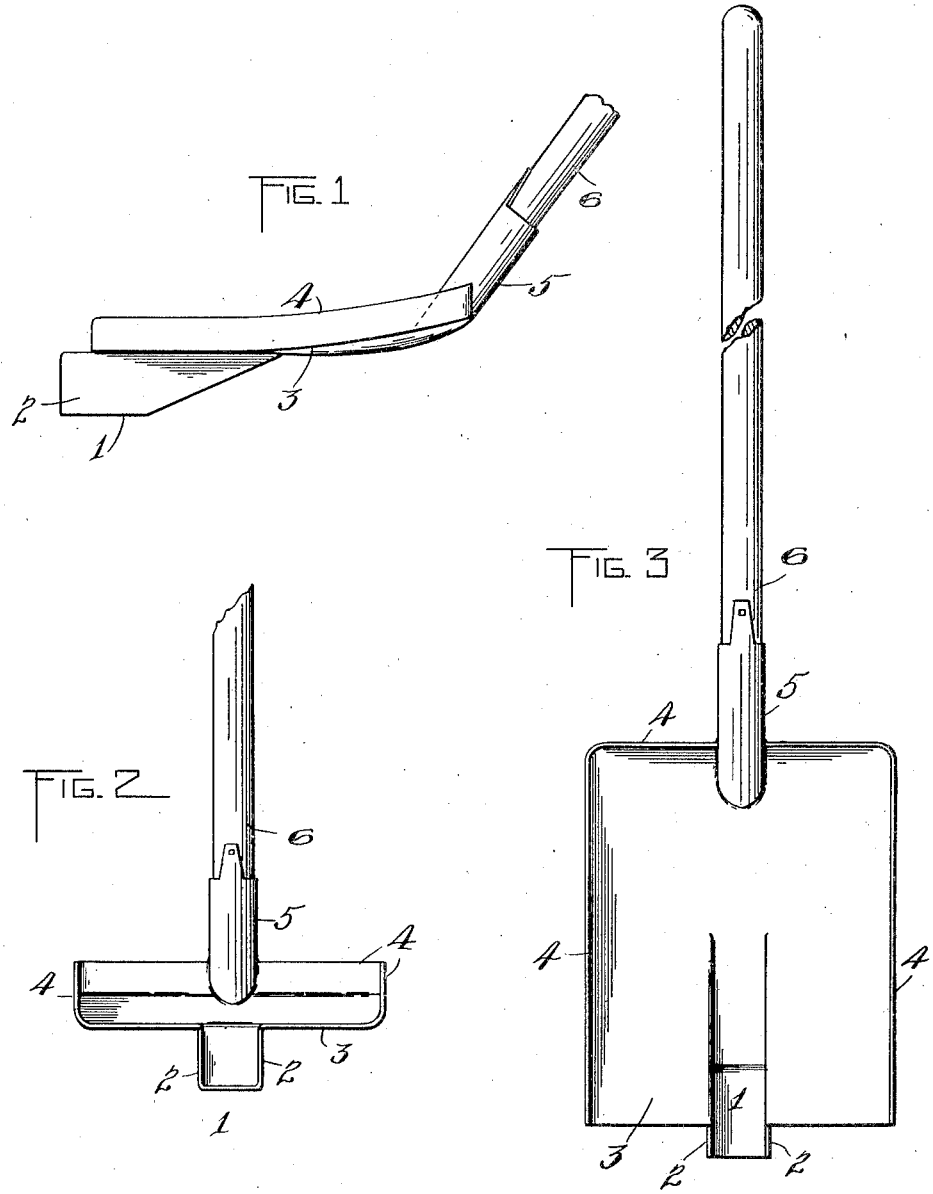

RICHARD A. SPECHT, OF ROCHESTER, NEW YORK, ASSIGNOR OF ONE-FIFTH TO FRANK N. SANDERSON, OF ROCHESTER, NEW YORK.

TRENCH-CUTTING TOOL.

1,357,359.	Specification of Letters Patent.	Patented Nov. 2, 1920.

Application filed March 15, 1920. Serial No. 365,780.

*To all whom it may concern:*

Be it known that I, RICHARD A. SPECHT, a citizen of the United States, and resident of Rochester, in the county of Monroe and State of New York, have invented certain new and useful Improvements in Trench-Cutting Tools, of which the following is a specification.

The present invention relates to a trench cutting tool of the type for providing small ditches or trenches about the edges of lawns, an object of this invention being to provide a simple and inexpensive tool which will cut the trench and at the same time collect the dirt removed from the trench.

To this and other ends, the invention consists of certain parts and combinations of parts all of which will be hereinafter described, the novel features being pointed out in the appended claims.

In the drawings:

Figure 1 is a side view of the tool, the handle being broken away;

Fig. 2 is a front view of the tool; and

Fig. 3 is a plan view of the tool.

In the illustrated embodiment of the invention, the tool comprises a trench cutting device formed preferably from sheet metal with a bottom wall 1 which inclines upwardly at its rear and upright side walls 2. The front end, and the top of this trench cutting device are open so that a trench cutting device of channel or scoop form is provided. The material which is cut by the trench cutting device is received into a receptacle formed preferably by a bottom wall 3 which lies on opposite sides of the trench cutting scoop or channel substantially in a plane with the upper edges of the side walls of said trench cutting device. The forward edge of this bottom wall of the receptacle is preferably in rear of the forward edge of the trench cutting scoop so as not to interfere with the penetration of the forward end of the scoop in the soil or ground, and the bottom wall of the trench cutting scoop merges into the bottom wall of the receptacle. In this way, the material cut by the scoop is caused to travel on to the bottom wall 3 while the forward edges of the bottom wall will collect the dirt which falls on opposite sides of the trench. The receptacle 3 has at its side and rear edges, flanges 4 which retain the material on the bottom wall 3. At the rear end of the bottom wall 3, a socket 5 may be provided for the handle 6 through which the tool is manipulated.

From the foregoing it will be seen that there has been provided a trench cutting tool in the form of a scoop having a receptacle which will collect the material from the scoop as well as any material which falls on opposite sides of the trench, this being due to the fact that the dirt collecting receptacle is open at its front and projects on opposite sides of the scoop. The construction permits the trench cutting scoop and receptacle to be made from one piece of sheet material so that an inexpensive structure is provided.

What I claim as my invention and desire to secure by Letters Patent is:—

1. A trench cutting tool comprising a trench cutting device, and a receptacle arranged above the trench cutting device to collect the dirt cut in making the trench.

2. A trench cutting tool comprising a trench cutting device having a bottom and side walls, and a receptacle for collecting the dirt cut in making the trench, said receptacle projecting on opposite sides of the trench cutting device in communication with said device.

3. A trench cutting tool comprising a trench cutting scoop, and a receptacle arranged above the trench cutting scoop and receiving the dirt from the scoop.

4. A trench cutting tool comprising a trench cutting scoop, and a receptacle receiving the dirt from the trench cutting scoop and projecting on opposite sides of said scoop.

5. A trench cutting tool comprising a dirt collecting receptacle open at its forward edge, and a trench cutting scoop arranged below said receptacle opening at its top to the receptacle and having an open forward end in advance of the dirt collecting receptacle.

6. A trench cutting tool comprising a trench cutting scoop open at its forward end and having upright side walls and a bottom wall which inclines upwardly at its rear end, and a dirt collecting receptacle open at its front end and having its bottom wall projecting on opposite sides of the trench cutting scoop substantially in the plane with the upper edges of the side walls of said scoop, the forward edge of the receptacle being in rear of the forward edge of the scoop.

RICHARD A. SPECHT.